United States Patent
Kim et al.

(10) Patent No.: US 12,088,103 B2
(45) Date of Patent: Sep. 10, 2024

(54) DIRECT CURRENT DISTRIBUTION BASED CHARGING/DISCHARGING SYSTEM FOR BATTERY FORMATION

(71) Applicant: LG ENERGY SOLUTION, LTD., Seoul (KR)

(72) Inventors: Hong-Kyun Kim, Daejeon (KR); Ik-Jae Lee, Daejeon (KR); Jong-Kwang Shin, Daejeon (KR); Tae-Wook An, Daejeon (KR); Chang-Sin Yeo, Daejeon (KR); Hee-Seung Wang, Daejeon (KR); Chan-Hee Lee, Daejeon (KR); Ji-Su Hong, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 71 days.

(21) Appl. No.: 17/795,375

(22) PCT Filed: Nov. 11, 2021

(86) PCT No.: PCT/KR2021/016473
§ 371 (c)(1),
(2) Date: Jul. 26, 2022

(87) PCT Pub. No.: WO2022/103183
PCT Pub. Date: May 19, 2022

(65) Prior Publication Data
US 2023/0055592 A1   Feb. 23, 2023

(30) Foreign Application Priority Data

Nov. 13, 2020   (KR) .................. 10-2020-0152311

(51) Int. Cl.
*H02J 3/32*   (2006.01)
*H02J 7/34*   (2006.01)

(52) U.S. Cl.
CPC ............... *H02J 3/32* (2013.01); *H02J 7/345* (2013.01); *H02J 2207/20* (2020.01)

(58) Field of Classification Search
CPC .......................................................... H02J 3/32
(Continued)

(56) References Cited

U.S. PATENT DOCUMENTS 9,455,578 B2   9/2016   Kim et al.
9,899,835 B2   2/2018   Mino et al.
(Continued)

FOREIGN PATENT DOCUMENTS

JP    2014-193111 A    10/2014
JP    6048572 B2       12/2016
(Continued)

OTHER PUBLICATIONS

International Search Report (PCT/ISA/210) issued in PCT/KR2021/016473, dated Feb. 25, 2022.
(Continued)

*Primary Examiner* — Joseph Chang
(74) *Attorney, Agent, or Firm* — Birch, Stewart, Kolasch & Birch, LLP

(57) ABSTRACT

A charging/discharging system to provide a direct current (DC) distribution based charging/discharging system for a battery formation process, in which a large number of batteries is connected in common to a DC grid through charge/discharge equipment, alternating current (AC) power from an AC power network is converted to DC power required for the battery formation process and the DC power is outputted to the DC grid is provided.

8 Claims, 6 Drawing Sheets

(58) Field of Classification Search
USPC .......................................................... 307/46
See application file for complete search history.

(56) References Cited

U.S. PATENT DOCUMENTS

| | | |
|---|---|---|
| 2012/0267952 A1 | 10/2012 | Ballatine et al. |
| 2014/0077596 A1* | 3/2014 | Nishibayashi ............ H02J 3/38 |
| | | 307/29 |
| 2015/0188350 A1 | 7/2015 | Deboy |
| 2016/0233699 A1 | 8/2016 | Kang |
| 2021/0066829 A1 | 3/2021 | Suzuki et al. |

FOREIGN PATENT DOCUMENTS

| | | |
|---|---|---|
| JP | 6074188 B2 | 2/2017 |
| JP | 2017-121171 A | 7/2017 |
| KR | 10-1431047 B1 | 8/2014 |
| KR | 10-1499325 B1 | 3/2015 |
| KR | 10-1591931 B1 | 2/2016 |
| KR | 10-1622511 B1 | 5/2016 |
| KR | 10-1741883 B1 | 5/2017 |
| KR | 10-1776997 B1 | 9/2017 |
| KR | 10-2018-0090673 A | 8/2018 |
| KR | 10-1925496 B1 | 12/2018 |
| WO | WO 2019/145997 A1 | 8/2019 |

OTHER PUBLICATIONS

Lee et al., "Integrated Operation of Power Conversion Module for DC Distribution System", The Transactions of the Korean Institute of Power Electronics, vol. 19, No. 3, Jun. 2014, pp. 240-248.

* cited by examiner

DIRECT CURRENT DISTRIBUTION BASED CHARGING/DISCHARGING SYSTEM FOR BATTERY FORMATION

TECHNICAL FIELD

The present application claims the benefit of Korean Patent Application No. 10-2020-0152311 filed on Nov. 13, 2020 with the Korean Intellectual Property Office, the disclosure of which is incorporated herein by reference in its entirety.

The present disclosure relates to technology for efficient power management in a battery formation process.

BACKGROUND ART

Recently, there has been a rapid increase in the demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

A battery becomes a finished product after it goes through an assembly process and a formation process in a sequential order. In the assembly process, a stack of a positive electrode, a negative electrode and a separator is received in a case together with an electrolyte and the case is sealed up. In the formation process, an initial charge/discharge event is executed on the battery having undergone the assembly process. The electrode material of the battery is activated by the formation process.

The battery formation process is performed for a few hours to a few days by repeating a procedure of setting a large number of batteries coupled to a common charge/discharge line as a charge group, a discharge group and a rest group according to a predefined formation schedule, and executing a charge event, a discharge event and a rest event for each group. The formation process requires a considerate amount of power and a related complicated control procedure, and thus above all, the efficiency and stability of power management is an important consideration.

DISCLOSURE

Technical Problem

The present disclosure is designed to solve the above-described problem, and therefore the present disclosure is directed to providing a direct current (DC) distribution based charging/discharging system for a battery formation process, in which a large number of batteries is connected in common to a DC grid through charge/discharge equipment, alternating current (AC) power from an AC power network is converted to DC power required for the battery formation process and the DC power is outputted to the DC grid.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A direct current (DC) distribution based charging/discharging system for battery formation according to an embodiment of the present disclosure includes a main power conversion unit configured to convert alternating current (AC) power from an AC power network to DC power having a reference voltage and output the DC power to a DC grid; a power system configured to detect the output power of the main power conversion unit; a charging/discharging unit including a plurality of chargers/dischargers electrically coupled to the DC grid, and a plurality of batteries in a one-to-one relationship with the plurality of chargers/discharges; and a general control unit configured to selectively transmit a first control signal commanding a charge event or a second control signal commanding a discharge event to each charger/discharger based on a formation schedule when the output power of the main power conversion unit is greater than a first threshold power. Each charger/discharger is configured to convert the DC power of the DC grid to charge power and charge a corresponding battery of the plurality of batteries in response to the first control signal. Each charger/discharger is configured to convert discharge power from the corresponding battery to DC power and output the DC power to the DC grid in response to the second control signal. Each charger/discharger is configured to stop charging and discharging the corresponding battery while the first control signal and the second control signal are not received.

The general control unit may be configured to change the formation schedule to transmit the first control signal to at least one charger/discharger of the plurality of charges/discharges that is in a rest state in which the first control signal and the second control signal are not received when the output power of the main power conversion unit is equal to or less than the first threshold power.

The charging/discharging system may further include a first protection unit electrically coupled between the DC grid and an external power network, the first protection unit being configured to prevent a voltage rise of the DC grid.

The general control unit may be configured to transmit a stand-by command to the first protection unit when the output power of the main power conversion unit is equal to or less than a second threshold power, which is less than the first threshold power. The first protection unit may be configured to selectively form a current path from the DC grid to the external power network in response to the stand-by command.

The first protection unit may include a first diode and a first sub power conversion unit. The first diode may be connected in series to the first sub power conversion unit through a first node between the DC grid and the external power network to provide a current path from the DC grid to the first sub power conversion unit. The first sub power conversion unit may be configured to output the DC power of the DC grid to the external power network when a voltage of the first node is equal to or higher than a first threshold voltage which is higher than the reference voltage during operation after the first sub power conversion unit is changed from the off state to the stand-by state in response to the stand-by command.

The charging/discharging system may further include a second protection unit electrically coupled between the DC grid and an external power network, the second protection unit being configured to prevent a voltage drop of the DC grid.

The second protection unit may include a super capacitor; a second sub power conversion unit electrically coupled between the super capacitor and the external power network, the second sub power conversion unit being configured to selectively charge the super capacitor using the power from the external power network; and a second diode to provide a current path from the super capacitor to the DC grid.

The general control unit may be configured to transmit a charge command to the second sub power conversion unit when a voltage of a second node is equal to or lower than a second threshold voltage which is lower than the reference voltage, the second node being a connection point between the super capacitor and the second diode. The second sub power conversion unit may be configured to charge the super capacitor in response to the charge command.

The charging/discharging system may further include a third protection unit electrically coupled to the DC grid and the general control unit, the third protection unit being configured to output emergency power having the reference voltage to the general control unit when a blackout in the AC power network occurs.

The third protection unit may include a backup battery; a third sub power conversion unit electrically coupled between the DC grid and the backup battery; and a third diode to provide a current path from the DC grid to the third sub power conversion unit. The third sub power conversion unit may be configured to selectively charge the backup battery using the power of the DC grid supplied through the third diode when the AC power network is in a normal condition. The third sub power conversion unit may be configured to selectively convert discharge power of the backup battery to the emergency power.

The charging/discharging system may further include a fourth protection unit installed on a power line connecting the DC grid to each charger/discharger. The general control unit may be configured to transmit a trip signal to the fourth protection unit when an insulation fault in the power line is detected.

Advantageous Effects

According to at least one of the embodiments of the present disclosure, a large number of batteries may be connected in common to the direct current (DC) grid through charge/discharge equipment, and the power converter installed between the DC grid and the alternating current (AC) power network may convert the AC power from the AC power network to DC power required for the battery formation process and output the DC power to the DC grid all at once. Accordingly, compared to the process in which each charger/discharger individually converts the AC power from the AC power network to DC power to charge the batteries, it is possible to reduce the amount of power required for the formation process.

Additionally, according to at least one of the embodiments of the present disclosure, the discharge power from each battery of the discharge group may be supplied to the DC grid as regenerative power, rather than being forcibly consumed. Accordingly, each battery of the charge group may be charged with the DC power and the regenerative power from the power converter, and thus it is possible to additionally reduce the amount of power required for the formation process.

Furthermore, according to at least one of the embodiments of the present disclosure, when the regenerative power from the discharge group exceeds the DC power used in the charge group, it is possible to prevent an excessive voltage rise of the DC grid by delivering the DC power of the DC grid to the external power network and/or changing some batteries of the rest group to the charge group.

Moreover, according to at least one of the embodiments of the present disclosure, when the DC power used in the charge group exceeds the regenerative power from the discharge group, it is possible to prevent an excessive voltage drop of the DC grid by delivering supplementary power from the super capacitor coupled to the external power network to the DC grid.

Further, according to at least one of the embodiments of the present disclosure, when blackout in the AC power network occurs, the DC power of the backup battery may be discharged and supplied to the load of the charging/discharging system.

The effects of the present disclosure are not limited to the effects mentioned above, and these and other effects not mentioned herein will be clearly understood by those skilled in the art from the appended claims.

DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

BEST MODE

Figure 1:
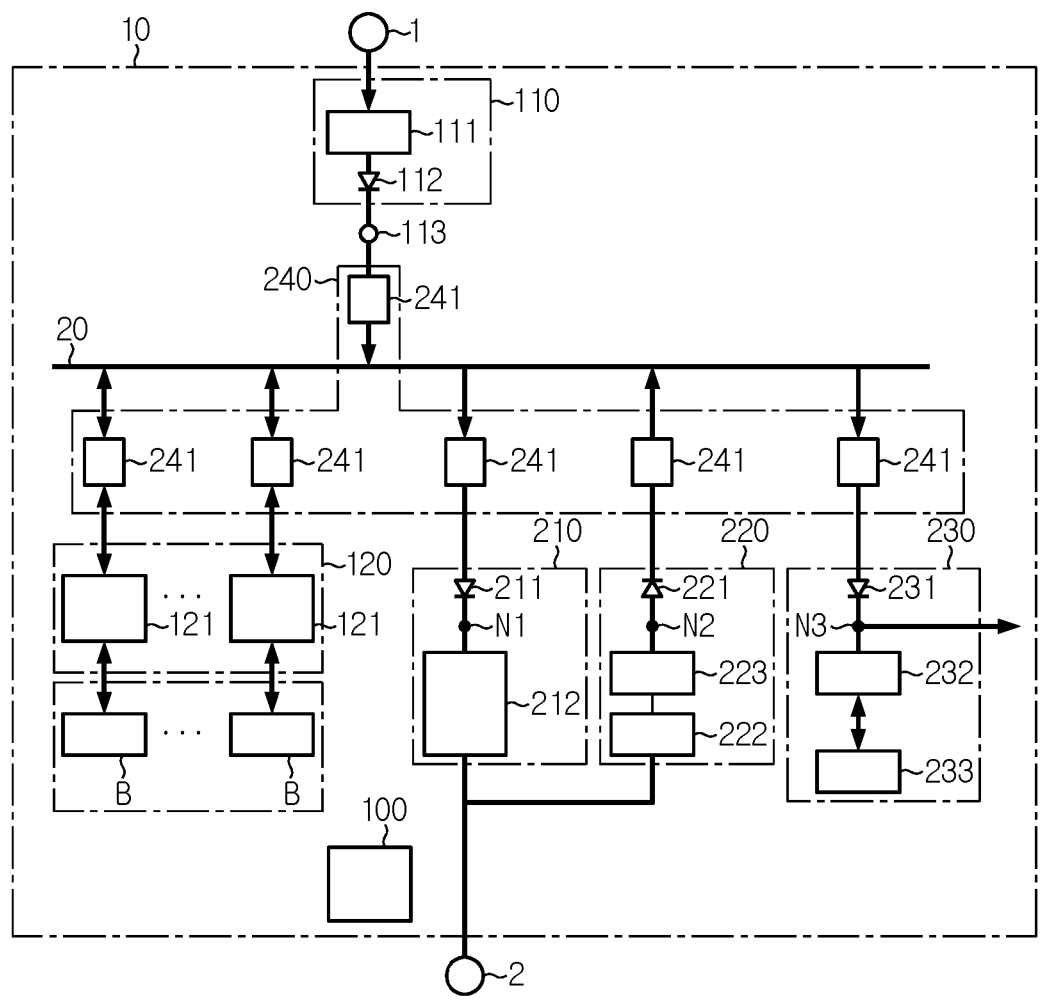
FIG. 1 is a schematic diagram showing the architecture of a direct current distribution based charging/discharging system for battery formation according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

The terms including the ordinal number such as "first", "second" and the like, are used to distinguish one element from another among various elements, but not intended to limit the elements by the terms.

Unless the context clearly indicates otherwise, it will be understood that the term "comprises" when used in this specification, specifies the presence of stated elements, but does not preclude the presence or addition of one or more other elements. Additionally, the term "control unit" as used herein refers to a processing unit of at least one function or operation, and this may be implemented by hardware and software either alone or in combination.

In addition, throughout the specification, it will be further understood that when an element is referred to as being "connected to" another element, it can be directly connected to the other element or intervening elements may be present.

Figure 2:
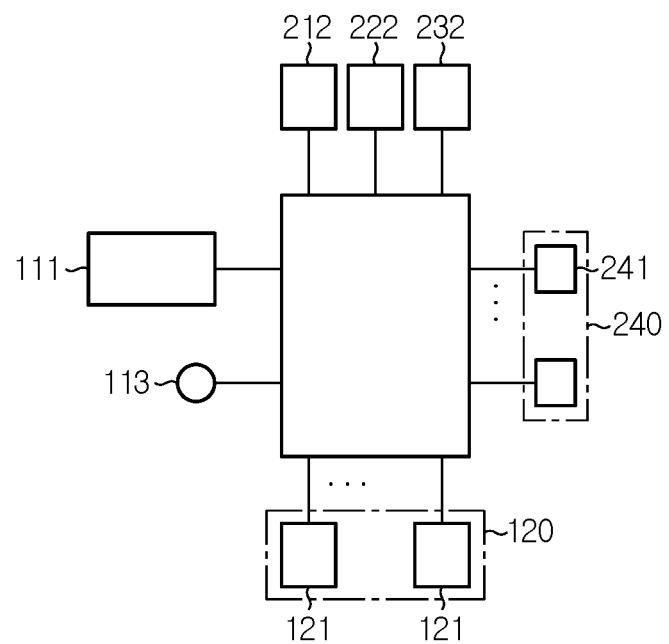
FIG. 2 is a schematic diagram of a communication connection relationship between the components of the charging/discharging system shown in FIG. 1.

FIG. 1 is a schematic diagram showing the architecture of a direct current (DC) distribution based charging/discharging system 10 for battery formation according to an embodiment of the present disclosure, and FIG. 2 is a schematic diagram of a communication connection relationship between the components of the charging/discharging system 10 shown in FIG. 1.

Referring to FIGS. 1 and 2, the charging/discharging system 10 includes a DC grid 20, a general control unit 100, a power system 113, a main power conversion unit 110 and a battery charging/discharging unit 120. The charging/discharging system 10 may further include a first protection unit 210, a second protection unit 220, a third protection unit 230 and a fourth protection unit 240.

The general control unit 100 is configured to monitor the operating status of each of an alternating current (AC) power network 1 operably coupled thereto, the DC grid 20, the main power conversion unit 110, the battery charging/discharging unit 120, the power system 113, the first protection unit 210, the second protection unit 220, the third protection unit 230 and the fourth protection unit 240, and perform a control function corresponding to the monitored operating status. The general control unit 100 may be configured to include, in hardware, at least one of application specific integrated circuits (ASICs), digital signal processors (DSPs), digital signal processing devices (DSPDs), programmable logic devices (PLDs), field programmable gate arrays (FPGAs), microprocessors, or electrical units for performing other functions. Additionally, the general control unit 100 may include at least one voltage sensor. Each voltage sensor may measure voltages of nodes N1, N2, N3 positioned in the charging/discharging system 10. The general control unit 100 may have a memory. The memory may include at least one type of storage medium of flash memory type, hard disk type, Solid State Disk (SSD) type, Silicon Disk Drive (SDD) type, multimedia card micro type, random access memory (RAM), static random access memory (SRAM), read-only memory (ROM), electrically erasable programmable read-only memory (EEPROM), or programmable read-only memory (PROM). The memory may store data and programs required for computation by the general control unit 100. The memory may store data indicating the computation results by the general control unit 100.

The main power conversion unit 110 is installed on a power line connecting the AC power network 1 to the DC grid 20. The main power conversion unit 110 converts AC power from the AC power network 1 to DC power based on the DC distribution and outputs the DC power to the DC grid 20. The voltage of the output power from the main power conversion unit 110 may be maintained at a reference voltage (for example, 370 V) by feedback control. The main power conversion unit 110 includes an AC-DC converter 111. The general control unit 100 may control the on/off and output power of the AC-DC converter 111 according to the operating status of the AC power network 1. The main power conversion unit 110 may further include a first protection diode 112. The first protection diode 112 provides a current path through which the forward current from the AC-DC converter 111 to the DC grid 20 flows.

The general control unit 100 may monitor the output power of the main power conversion unit 110 based on a detection value of the power system 113. The power system 113 is installed on a power line between the main power conversion unit 110 and the DC grid 20. The power system 113 detects the DC power output from the main power conversion unit 110, and transmits the detection value indicating the detected DC power to the general control unit 100.

The general control unit 100 may perform a control function for protecting the entire charging/discharging system 10 when unstable voltage of the AC power network 1 and/or the DC grid 20 is detected based on the detection value of the power system 113.

Specifically, as a load applied to the DC grid 20 decreases, the detection value of the power system 113 decreases. For example, in an excessive power situation in which regenerative power supplied from a discharge group to the DC grid 20 is greater than the DC power supplied from the DC grid 20 to a charge group, the main power conversion unit 110 may reduce the output power to prevent an excessive rise in the DC voltage of the DC grid 20.

As the load applied to the DC grid 20 increases, the detection value of the power system 113 increases. For example, in a power shortage situation in which the DC power supplied from the DC grid 20 to the charge group is greater than the regenerative power supplied from the discharge group to the DC grid 20, the main power conversion unit 110 may increase the output power to prevent an excessive drop of the DC voltage of the DC grid 20.

The battery charging/discharging unit 120 is configured to link a plurality of batteries B on which formation is to be performed to the DC grid 20. The battery charging/discharging unit 120 includes a plurality of chargers/dischargers 121. The plurality of chargers/dischargers 121 is provided to the plurality of batteries B in a one-to-one relationship. The chargers/dischargers 121 are installed on power lines between the DC grid 20 and the batteries B to relay the bi-directional power transfer between the DC grid 20 and the batteries B. The charger/discharger 121 may include a single bi-directional DC-DC converter or two bi-directional DC-DC converters connected in series.

When the operating status of the DC grid 20 is normal, the general control unit 100 controls the main power conversion unit 110 and the battery charging/discharging unit 120 according to a control sequence based on formation schedule information.

Specifically, when the output power of the main power conversion unit 110 is greater than a first threshold power (for example, 20 kW), the general control unit 100 may classify the plurality of batteries B into a charge group, a discharge group and a rest group based on the predefined formation schedule information at a preset time interval.

The general control unit 100 may transmit a first control signal commanding a charge event to the charger/discharger 121 coupled to the battery B of the charge group and a second control signal commanding a discharge event to the charger/discharger 121 coupled to the battery B of the discharge group.

The charger/discharger 121 converts the DC power of the DC grid 20 to charge power and charges the battery B in response to the first control signal. That is, the charger/discharger 121 steps down the DC voltage of the DC grid 20 to DC voltage required to charge the battery B in response to the first control signal.

The charger/discharger 121 outputs the regenerative power generated by the discharge of the battery B to the DC grid 20 in response to the second control signal. That is, the charger/discharger 121 steps up the DC voltage of the discharge power of the battery B to DC voltage required for the DC grid 20 in response to the second control signal.

The charger/discharger 121 turns the battery B into a rest mode while the first control signal and the second control signal are not received. The rest mode is a mode in which the charge/discharge of the battery B stops.

When the output power of the main power conversion unit 110 is equal to or less than the first threshold power (for example, 20 kW), the general control unit 100 may change the formation schedule information to increase the amount of power supplied from the DC grid 20 to the battery charging/discharging unit 120 and transmit the first control signal to at least one charger/discharger 121 which is being controlled into the rest state.

Meanwhile, the control function of the main power conversion unit 110 alone may be difficult to completely deal with an unstable voltage situation of the DC grid 20. The charging/discharging system 10 uses at least one of the first protection unit 210, the second protection unit 220, the third protection unit 230 or the fourth protection unit 240 as an auxiliary means for preventing a sharp change in voltage of the DC grid 20.

When the output power of the main power conversion unit 110 is equal to or less than a second threshold power, the general control unit 100 may transmit a stand-by command to the first protection unit 210. The second threshold power is a smaller value than the first threshold power, and may be a reference value for determining an excess situation of regenerative power supplied to the DC grid 20.

The first protection unit 210 is installed on a power line connecting the DC grid 20 to an external power network 2. The first protection unit 210 includes a first sub power conversion unit 212 and a first protection diode 211 connected in series. The first protection diode 211 is connected between the DC grid 20 and the input terminal of the first sub power conversion unit 212. The first protection diode 211 provides a current path through which the forward current from the DC grid 20 to the first sub power conversion unit 212 flow.

The first protection unit 210 is kept in an off state in which there is no power consumption while the stand-by command is not received. That is, only when the output power of the main power conversion unit 110 is equal to or less than the second threshold power, the general control unit 100 may operate the first protection unit 210, thereby reducing the unnecessary power consumption of the first protection unit 210.

When the stand-by command is received, the first protection unit 210 is changed from the off state to a stand-by state. The first sub power conversion unit 212 changes the stand-by state to an on state when the voltage of the first node N1 is equal to or higher than a first threshold voltage (for example, 380 V) which is higher than the reference voltage during the operation in the stand-by state in response to the stand-by command. The first node N1 may be a connection point between the DC grid 20 and the first protection diode 211 or a connection point between the first protection diode 211 and the input terminal of the first sub power conversion unit 212. The first sub power conversion unit 212 may include at least one of a unidirectional DC-DC converter or a unidirectional DC-AC converter. The first sub power conversion unit 212 converts the DC power of the DC grid 20 to DC power and/or AC power having the allowable range of voltage by the external power network 2 during the operation in the on state. Accordingly, it is possible to prevent an excessive rise in the DC voltage of the DC grid 20.

The second protection unit 220 is installed on the power line connecting the external power network 2 to the DC grid 20. The second protection unit 220 includes a second protection diode 221, a super capacitor 223 and a second sub power conversion unit 222 connected in series. The second protection diode 221 is connected between the super capacitor 223 and the DC grid 20. The second protection diode 221 provides a current path through which the forward current from the super capacitor 223 to the DC grid 20 flows. The input and output terminals of the second sub power conversion unit 222 are coupled to the external power network 2 and the super capacitor 223, respectively.

When voltage of the second node N2 which is a connection point between the super capacitor 223 and the second protection diode 221 is equal to or lower than a second threshold voltage (for example, 360 V) which is lower than the reference voltage, the general control unit 100 may transmit a charge command to the second sub power conversion unit 222.

The second sub power conversion unit 222 may be kept in the off state in which there is no power consumption while the charge command is not received. When the charge command is received, the second sub power conversion unit 222 changes from the off state to the on state, converts the DC power and/or AC power from the external power network 2 to DC power having the second threshold voltage and charges the super capacitor 223. When the voltage of the DC grid 20 drops below the second threshold voltage, the DC power charged in the super capacitor 223 is supplied as backup power to the DC grid 20 through the second protection diode 221 by a voltage difference between the super capacitor 223 and the DC grid 20. During the charge to the second threshold voltage, the super capacitor 223 may have a sufficient capacity to delay power interruption of the DC grid 20 for a predetermined backup time (for example, 1 to 5 seconds) or longer. Accordingly, it is possible to prevent an excessive drop in the DC voltage of the DC grid 20.

The general control unit 100 performs feedback control of the second sub power conversion unit 222, thereby preventing voltage overshoots during the charge of the super capacitor 223 by the second sub power conversion unit 222.

When blackout in the AC power network 1 occurs, the general control unit 100 may transmit a third discharge command to the third protection unit 230. The third protection unit 230 is configured to charge the DC power while the AC power network 1 is in normal condition and supply emergency power to the load when blackout in the AC power network 1 occurs.

The third protection unit 230 includes a third protection diode 231, a third sub power conversion unit 232 and a backup battery 233 connected in series. The third protection diode 231 is connected between the DC grid 20 and the third sub power conversion unit 232. The third protection diode 231 provides a current path through which the forward current from the DC grid 20 to the third sub power conversion unit 232 flows. The third sub power conversion unit 232 may include a bi-directional DC-DC converter. When a discharge command is not received, the third sub power conversion unit 232 is configured to generate charge power for the backup battery 233 using the DC power from the DC grid 20 supplied through the third protection diode 231.

The third protection unit 230 steps up the voltage of the discharge power of the backup battery 233 and outputs the emergency power in response to a third wake-up signal. The voltage of the emergency power is equal to or higher than the reference voltage, and accordingly the DC grid 20 is cut off from the emergency power by the third protection diode 231, while the load is supplied with the emergency power through the third node N3 which is a connection point between the third protection diode 231 and the third sub power conversion unit 232. Here, the load supplied with the emergency power is not limited to a specific type and may include any component included in the charging/discharging system 10 such as the general control unit 100.

The third protection unit 230 may effectively protect the charging/discharging system 10 through interaction with the second protection unit 220. Specifically, when blackout in the AC power network 1 occurs, it is possible to prevent power interruption of the DC grid 20 by the second protection unit 220 while the general control unit is re-booting using the emergency power from the third protection unit 230.

The fourth protection unit 240 includes a breaker 241 installed on each power line connected to the DC grid 20. That is, each one breaker 241 may be installed between the DC grid 20 and each of the main power conversion unit 110, the charger/discharger 121, the first protection unit 210, the second protection unit 220, the third protection unit 230 and the fourth protection unit 240. The general control unit 100 monitors an insulation fault (for example, a short circuit, a ground fault) in each power line in which the breaker 241 is installed. The general control unit 100 transmits a trip signal to the breaker 241 of each power line in which the insulation fault is detected to disconnect from the DC grid 20.

Figure 3:
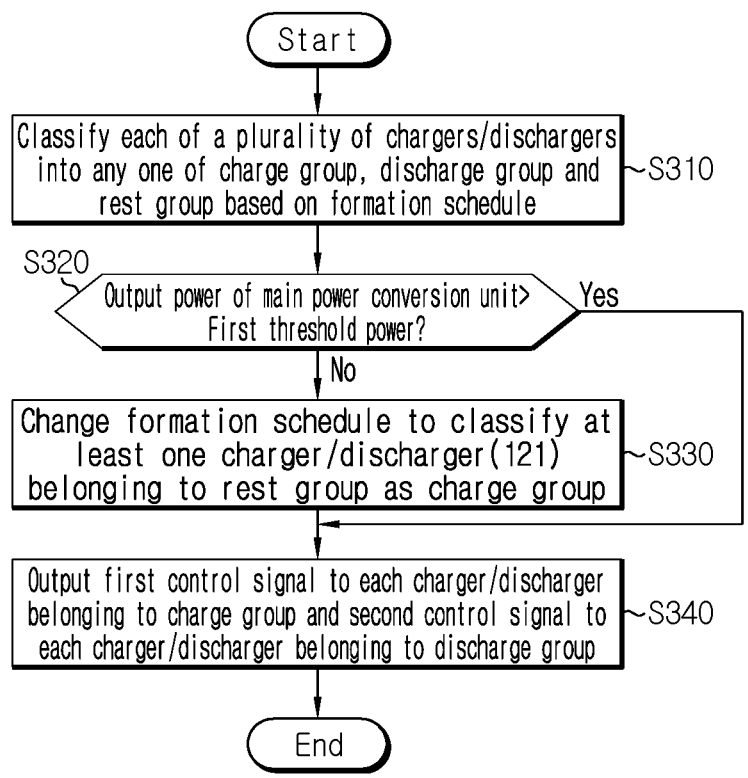
FIG. 3 is a flowchart exemplarily showing a control method for a battery charging/discharging unit shown in FIG. 1.

FIG. 3 is a flowchart exemplarily showing the control method for the battery charging/discharging unit 120 shown in FIG. 1. The method of FIG. 3 may be iteratively performed at the preset time interval until the completion of the formation process for the plurality of batteries B.

Referring to FIGS. 1 to 3, in step S310, the general control unit 100 classifies each of the plurality of chargers/dischargers 121 into any one of the charge group, the discharge group and the rest group based on a predefined formation schedule.

In step S320, the general control unit 100 determines whether the output power of the main power conversion unit 110 is greater than the first threshold power based on the detection value of the power system 113. When a value of the step S320 is "No", step S330 is performed. When the value of the step S320 is "Yes", step S340 is performed.

In the step S330, the general control unit 100 changes the formation schedule to classify at least one charger/discharger 121 belonging to the rest group as the charge group.

In the step S340, the general control unit 100 outputs the first control signal to each charger/discharger 121 belonging to the charge group and the second control signal to each charger/discharger 121 belonging to the discharge group.

Figure 4:
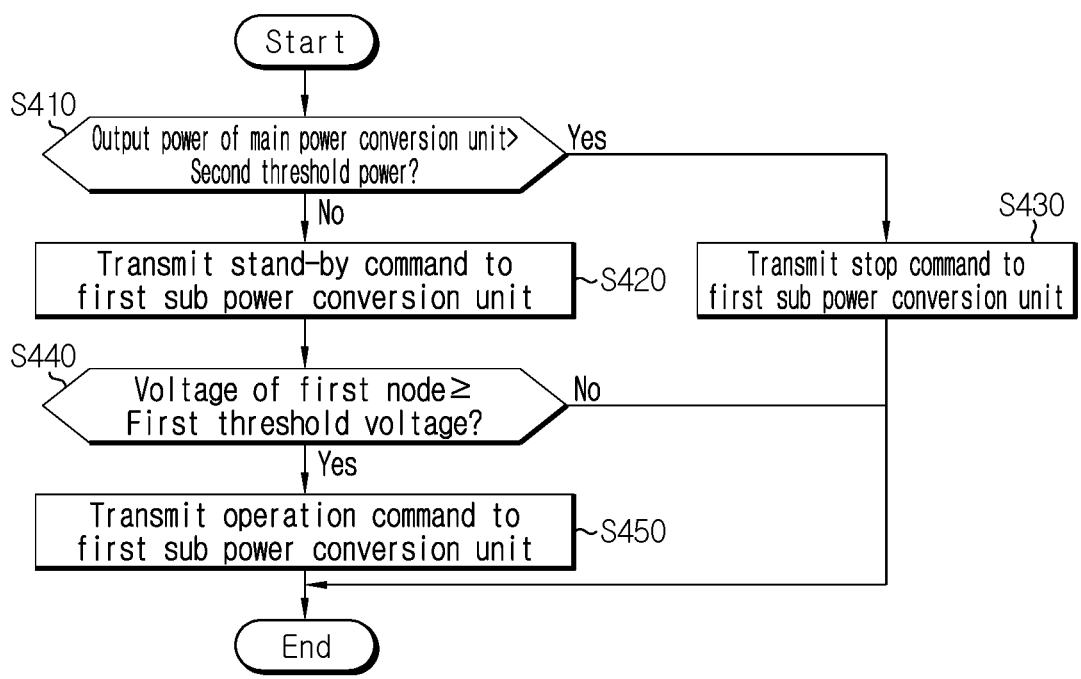
FIG. 4 is a flowchart exemplarily showing a control method for a first protection unit shown in FIG. 1.

FIG. 4 is a flowchart exemplarily showing the control method for the first protection unit 210 shown in FIG. 1. The method of FIG. 4 may be iteratively performed at the preset time interval until the completion of the formation process for the plurality of batteries B.

In step S410, the general control unit 100 determines whether the output power of the main power conversion unit 110 is greater than the second threshold power based on the detection value of the power system 113. When a value of the step S410 is "No", step S420 is performed. When the value of the step S410 is "Yes", step S430 is performed.

In the step S420, the general control unit 100 transmits a stand-by command to the first sub power conversion unit 212. In response to the stand-by command, the first sub power conversion unit 212 turns into the stand-by state.

In the step S430, the general control unit 100 transmits a first stop command to the first sub power conversion unit 212. In response to the first stop command, the first sub power conversion unit 212 turns into the off state.

In step S440, the general control unit 100 determines whether the voltage of the first node N1 of the first sub power conversion unit 212 is equal to or higher than the first threshold voltage. The step S440 may be performed by the first sub power conversion unit 212 instead of the general control unit 100. When a value of the step S440 is "Yes", step S450 is performed.

In the step S450, the general control unit 100 transmits a first operation command to the first sub power conversion unit 212. In response to the first operation command, the first sub power conversion unit 212 outputs the DC power of the DC grid 20 to the external power network 2.

Figure 5:
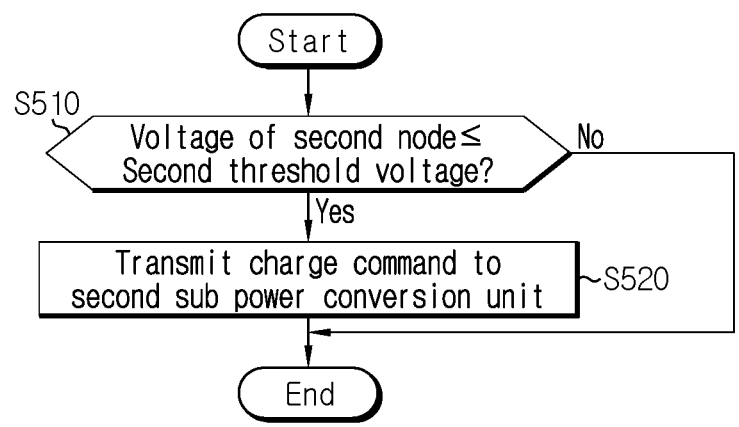
FIG. 5 is a flowchart exemplarily showing a control method for a second protection unit shown in FIG. 1.

FIG. 5 is a flowchart exemplarily showing the control method for the second protection unit 220 shown in FIG. 1. The method of FIG. 5 may be iteratively performed at the preset time interval until the completion of the formation process for the plurality of batteries B.

In step S510, the general control unit 100 determines whether the voltage of the super capacitor 223 is equal to or lower than the second threshold voltage. When a value of the step S510 is "Yes", step S520 is performed.

In the step S520, the general control unit 100 transmits a charge command to the second sub power conversion unit 222. In response to the charge command, the second sub power conversion unit 222 converts the power from the external power network 2 to charge power for the super capacitor 223.

Figure 6:
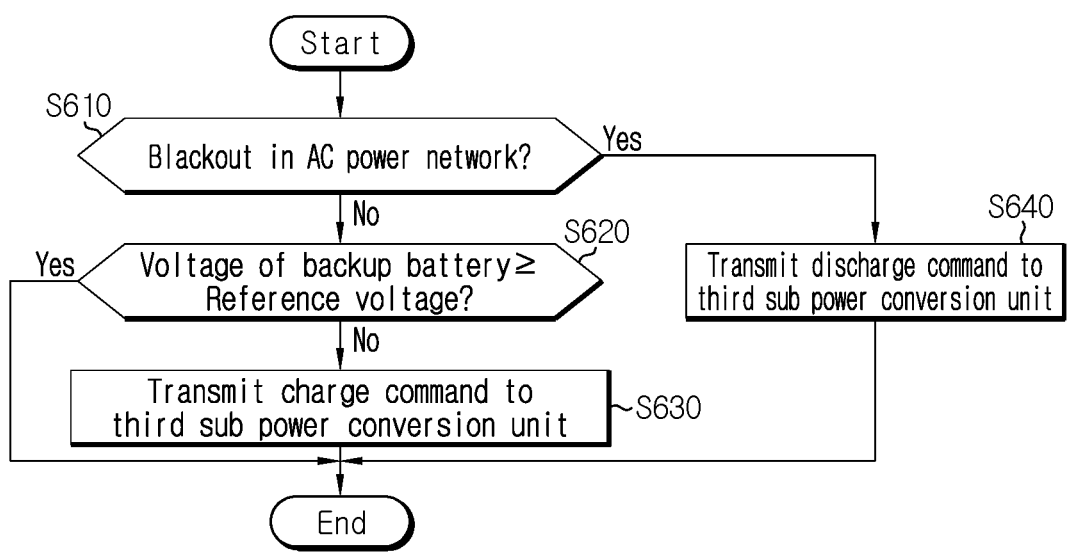
FIG. 6 is a flowchart exemplarily showing a control method for a third protection unit shown in FIG. 1.

FIG. 6 is a flowchart exemplarily showing the control method for the third protection unit 230 shown in FIG. 1. The method of FIG. 6 may be iteratively performed at the preset time interval until the completion of the formation process for the plurality of batteries B.

In step S610, the general control unit 100 determines whether blackout in the AC power network 1 occurred. When a value of the step S610 is "No", step S620 is performed. When the value of the step S610 is "Yes", step S640 is performed.

In the step S620, the general control unit 100 determines whether the voltage of the backup battery 233 is equal to or higher than the reference voltage. When a value of the step S620 is "No", step S630 is performed.

In the step S630, the general control unit 100 transmits a charge command to the third sub power conversion unit 232. In response to the charge command, the third sub power conversion unit 232 converts the DC power from the DC grid 20 to charge power for the backup battery 233.

In the step S640, the general control unit 100 transmits a discharge command to the third sub power conversion unit 232. In response to the discharge command, the third sub power conversion unit 232 converts the discharge power from the backup battery 233 to emergency power.

The embodiments of the present disclosure described hereinabove are not implemented only through the apparatus and method, and may be implemented through programs that perform functions corresponding to the configurations of the embodiments of the present disclosure or recording media having the programs recorded thereon, and such implementation may be easily achieved by those skilled in the art from the disclosure of the embodiments described above.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, since many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

DESCRIPTION OF REFERENCE NUMERALS

1: AC power network
2: External power network
10: Charging/discharging system
20: DC grid
100: General control unit
110: Main power conversion unit
113: Power system
120: Battery charging/discharging unit
121: Charger/discharger
210: First protection unit
211: First protection diode
212: First sub power conversion unit
220: Second protection unit
221: Second protection diode
222: Second sub power conversion unit
223: Super capacitor
230: Third protection unit
231: Third protection diode
232: Third sub power conversion unit
233: Backup battery
240: Fourth protection unit
241: Breaker

What is claimed is:

1. A direct current (DC) distribution based charging/discharging system for battery formation, comprising:
a main power conversion unit configured to convert alternating current (AC) power from an AC power network to DC power having a reference voltage and output the DC power to a DC grid;
a power system configured to detect the output power of the main power conversion unit;
a charging/discharging unit including:
a plurality of chargers/dischargers coupled to the DC grid; and
a plurality of batteries in a one-to-one relationship with the plurality of chargers/dischargers;
a general control unit configured to selectively transmit a first control signal commanding a charge event or a second control signal commanding a discharge event to each charger/discharger based on a formation schedule when the output power of the main power conversion unit is greater than a first threshold power; and
a first protection unit electrically coupled between the DC grid and an external power network, the first protection unit being configured to prevent a voltage rise of the DC grid,
wherein each charger/discharger is configured to:
convert the DC power of the DC grid to charge power and charge a corresponding battery of the plurality of batteries in response to the first control signal,
convert discharge power from the corresponding battery to DC power and output the DC power to the DC grid in response to the second control signal, and
stop charging and discharging the corresponding battery while the first control signal and the second control signal are not received,
wherein the general control unit is configured to transmit a stand-by command to the first protection unit when the output power of the main power conversion unit is equal to or less than a second threshold power, which is less than the first threshold power, and
wherein the first protection unit is configured to selectively form a current path from the DC grid to the external power network in response to the stand-by command.

2. The DC distribution based charging/discharging system for battery formation according to claim 1, wherein the general control unit is configured to change the formation schedule to transmit the first control signal to at least one charger/discharger of the plurality of chargers/dischargers that is in a rest state in which the first control signal and the second control signal are not received when the output power of the main power conversion unit is equal to or less than the first threshold power.

3. The DC distribution based charging/discharging system for battery formation according to claim 1, wherein the first protection unit includes a first protection diode and a first sub power conversion unit,
wherein the first protection diode is connected in series to the first sub power conversion unit through a first node between the DC grid and the external power network to provide a current path from the DC grid to the first sub power conversion unit, and
wherein the first sub power conversion unit is configured to output the DC power of the DC grid to the external power network when a voltage of the first node is equal to or higher than a first threshold voltage which is higher than the reference voltage during operation after the first sub power conversion unit is changed from the off state to the stand-by state in response to the stand-by command.

4. The DC distribution based charging/discharging system for battery formation according to claim 1, further comprising:
a fourth protection unit installed on a power line connecting the DC grid to each charger/discharger,
wherein the general control unit is configured to transmit a trip signal to the fourth protection unit when an insulation fault in the power line is detected.

5. A direct current (DC) distribution based charging/discharging system for battery formation, comprising:
a main power conversion unit configured to convert alternating current (AC) power from an AC power network to DC power having a reference voltage and output the DC power to a DC grid;
a power system configured to detect the output power of the main power conversion unit;

a charging/discharging unit including:
  a plurality of chargers/dischargers coupled to the DC grid; and
  a plurality of batteries in a one-to-one relationship with the plurality of chargers/dischargers;
a general control unit configured to selectively transmit a first control signal commanding a charge event or a second control signal commanding a discharge event to each charger/discharger based on a formation schedule when the output power of the main power conversion unit is greater than a first threshold power; and
a second protection unit electrically coupled between the DC grid and an external power network, the second protection unit being configured to prevent a voltage drop of the DC grid,
wherein each charger/discharger is configured to:
  convert the DC power of the DC grid to charge power and charge a corresponding battery of the plurality of batteries in response to the first control signal,
  convert discharge power from the corresponding battery to DC power and output the DC power to the DC grid in response to the second control signal, and
  stop charging and discharging the corresponding battery while the first control signal and the second control signal are not received,
wherein the second protection unit includes:
  a super capacitor;
  a second sub power conversion unit electrically coupled between the super capacitor and the external power network, the second sub power conversion unit being configured to selectively charge the super capacitor using the power from the external power network; and
  a second protection diode to provide a current path from the super capacitor to the DC grid.

6. The DC distribution based charging/discharging system for battery formation according to claim 5, wherein the general control unit is configured to transmit a charge command to the second sub power conversion unit when a voltage of a second node is equal to or lower than a second threshold voltage which is lower than the reference voltage, the second node being a connection point between the super capacitor and the second protection diode, and
  wherein the second sub power conversion unit is configured to charge the super capacitor in response to the charge command.

7. A direct current (DC) distribution based charging/discharging system for battery formation, comprising:
  a main power conversion unit configured to convert alternating current (AC) power from an AC power network to DC power having a reference voltage and output the DC power to a DC grid;
  a power system configured to detect the output power of the main power conversion unit;
  a charging/discharging unit including:
    a plurality of chargers/dischargers coupled to the DC grid; and
    a plurality of batteries in a one-to-one relationship with the plurality of chargers/dischargers;
  a general control unit configured to selectively transmit a first control signal commanding a charge event or a second control signal commanding a discharge event to each charger/discharger based on a formation schedule when the output power of the main power conversion unit is greater than a first threshold power; and
  a third protection unit electrically coupled to the DC grid and the general control unit, the third protection unit being configured to output emergency power having the reference voltage to the general control unit when a blackout in the AC power network occurs,
  wherein each charger/discharger is configured to:
    convert the DC power of the DC grid to charge power and charge a corresponding battery of the plurality of batteries in response to the first control signal,
    convert discharge power from the corresponding battery to DC power and output the DC power to the DC grid in response to the second control signal, and
    stop charging and discharging the corresponding battery while the first control signal and the second control signal are not received,
  wherein the third protection unit includes:
    a backup battery;
    a third sub power conversion unit electrically coupled between the DC grid and the backup battery; and
    a third protection diode to provide a current path from the DC grid to the third sub power conversion unit, and
  wherein the third sub power conversion unit is configured to selectively charge the backup battery using the power of the DC grid supplied through the third protection diode when the AC power network is in a normal condition.

8. The DC distribution based charging/discharging system for battery formation according to claim 7, wherein the third protection unit is configured to selectively convert discharge power of the backup battery to the emergency power.

* * * * *